July 10, 1956 W. A. LOMBARDI 2,753,580
BRUSH-MOUNTING MEANS
Filed June 3, 1950 3 Sheets-Sheet 1

Inventor
WILLIAM A. LOMBARDI
By Mitchell + Bechert
Attorneys

July 10, 1956 W. A. LOMBARDI 2,753,580
BRUSH-MOUNTING MEANS
Filed June 3, 1950 3 Sheets-Sheet 2

Inventor
WILLIAM A. LOMBARDI
By Mitchell + Bechert
Attorneys

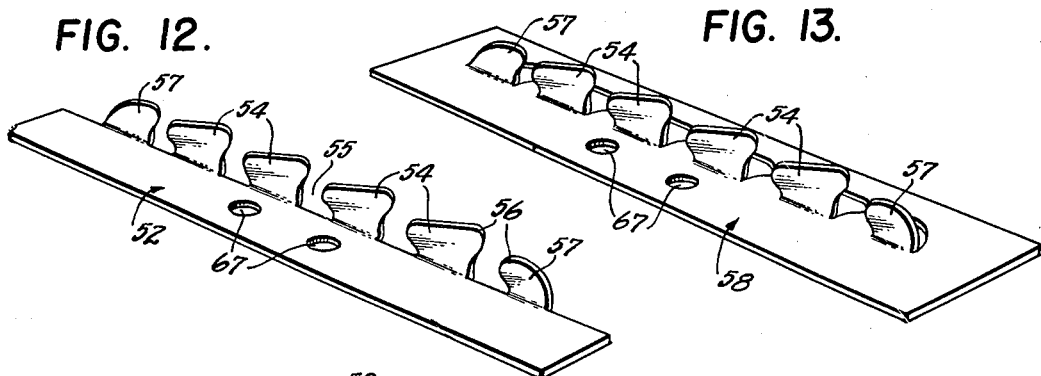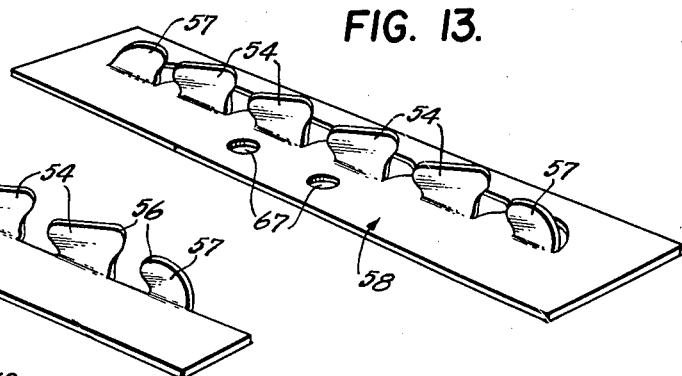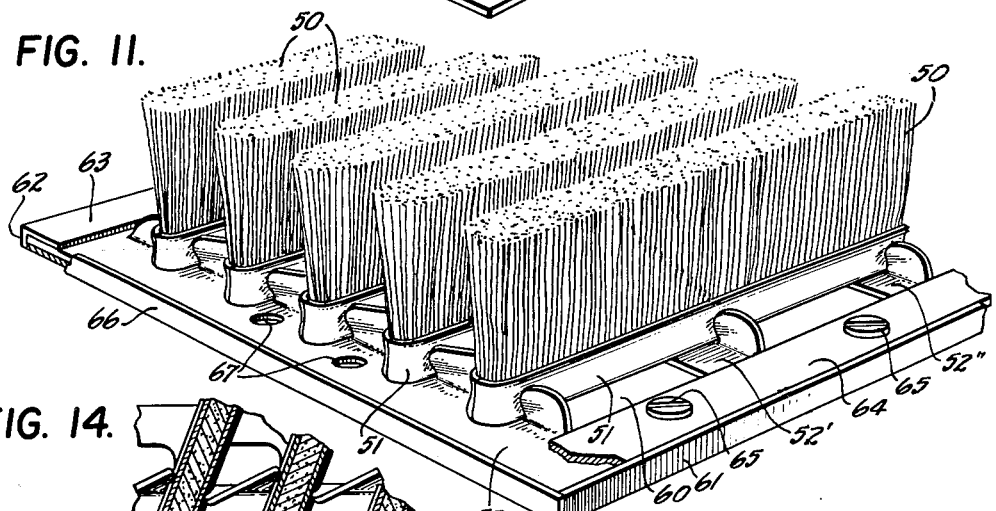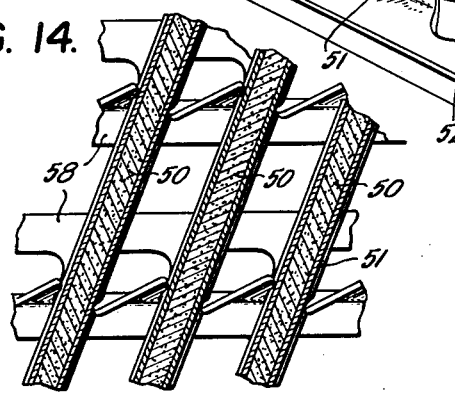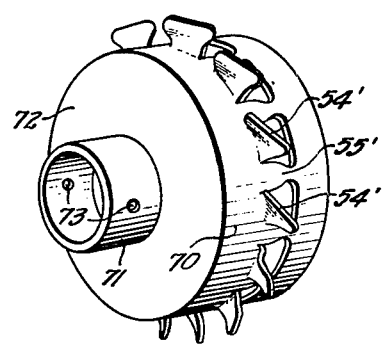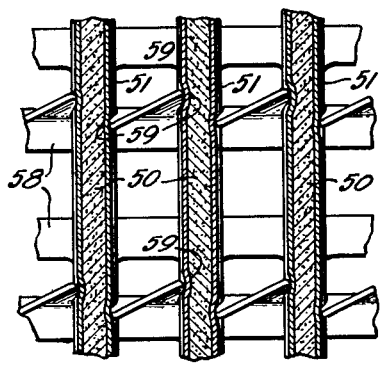

United States Patent Office 2,753,580
Patented July 10, 1956

2,753,580

BRUSH-MOUNTING MEANS

William A. Lombardi, Derby, Conn.

Application June 3, 1950, Serial No. 165,929

18 Claims. (Cl. 15—202)

My invention relates to brushes and in particular to supporting means for brushes composed of one or more strip-type brush elements. The invention is in the nature of an improvement over the constructions shown in my copending patent applications, Serial No. 750,928, filed May 28, 1947, now Patent 2,651,798, Sept. 15, 1953 and Serial No. 141,420, filed January 31, 1950.

It is an object of my invention to provide an improved construction of the character indicated.

It is another object to provide improved clamping means for a brush-supporting structure of the character indicated.

It is a further object to provide an improved supporting means for a brush strip.

It is also an object to provide a brush-strip supporting means which may integrally include means for clamping the brush strip to the supporting means.

It is a general object to provide such a simple and cheap brush-supporting structure that it will not be economically feasible to reuse the structure once the brush elements become worn, and so that the supporting structure may be assembled to brush elements so permanently as never to permit the loss or dislocation of a brush element.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 11 is a fragmentary, partly broken-away, perspective view of an assembled brush-supporting means representing a modified form of the invention;

Figs. 12 and 13 are perspective views of alternative brush-supporting elements for use in an assembly as shown in Fig. 11;

Figure 1:
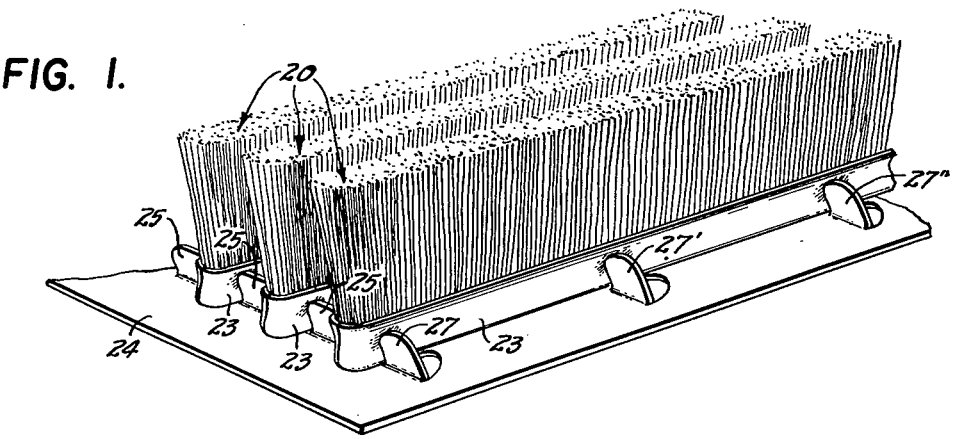
Fig. 1 is a fragmentary view in perspective of a brush-supporting means incorporating features of the invention and shown securely clamping a plurality of brush strips.

Figs. 14 and 15 are enlarged fragmentary plan views of brush strips and of their supporting elements suitable for use in an assembly such as that of Fig. 11, the brush strips being shown in section in a plane including the areas of clamping action, and the parts being shown in Fig. 14 prior to clamping action and in Fig. 15 after clamping action; and Fig. 16 is a perspective view of a brush-supporting means suitable for use in a drum or cylindrical assembled configuration.

Briefly stated, my invention contemplates an improved brush-supporting structure for receiving and securely holding preassembled brush strips. The brush strips are assemblies of bristles projecting essentially in one plane and bound together at the base by a longitudinally extending generally U-shaped binder. The supporting means may be of sheet material with a plurality of generally aligned lugs bent from the surface of such material. Spaces between adjacent lugs may define slots for the reception of brush strips, and by suitably forming one or more adjacent sides of adjacent lugs the walls of the slots may converge toward the opening or mouth thereof, so as to provide a means for embracing and retaining the brush strips against loss out the mouth of the slot. The material of the lugs may include an excess (or what may be termed effectively an excess) between adjacent slotted openings, so that after insertion of brush-strip binders in the various slots, the excess material may serve to bind and to clamp the brush-strip binder, as after a deforming, twisting, bending or the like operation. The brush-supporting means may then securely anchor the brush strips in assembled relation therewith.

In one general arrangement to be described, the excess material at the slotted openings is deliberately made to cause such restricted openings that brush-strip binders may not be inserted therein, and a twisting or other deforming operation is necessary in order effectively to open up the slotted openings to receive the binders; once the brush-strip binders have been inserted, some (and preferably all) of the lugs may be bent back toward their original position, thus effectively restricting the slot openings and crimping the lugs and the brush strip together in the process. In another general arrangement, the lugs are bent straight out of the material of the base or body of the brush-supporting means and are so formed that opposed converging portions or projections define the outer limit of each slot, and the slots are of sufficient size to permit insertion of brush-strip binders; securing is then achieved by bending the lugs generally toward the surface from which they were originally bent or struck up. In still another general arrangement, the excess material at the slotted openings is not deformed in the securing operation but is utilized in an effective reduction of a projected slot area, as upon a relative transverse or rotational displacement of two spaced supporting means, or upon a relative-twisting of a brush strip and of its supporting means.

Referring to Figs. 1 to 6 of the drawings, my invention is shown in application to an integral brush-supporting means and clamp, which may be utilized to hold a flat arrangement of a plurality of longitudinally extending brush strips 20. The brush strips may comprise bristles 21 bent around an anchoring core or wire 22 (Fig. 3) and held crimped by a generally U-shaped holder or binding member 23, so as to project in essentially one direction for the longitudinal extent of the brush strip.

In accordance with the invention, integral brush-supporting and clamping means for a plurality of brush strips 20 may be provided from a sheet or plate 24 having a plurality of lugs 25 bent out of the surface thereof. The lugs 25 may be bent up from the ends of the plate 24, or as in the form shown the lugs 25 may be struck out of the body of the plate 24. The lugs 25 may be struck up in generally transversely aligned rows, as in the case of the rows of lugs 25—25'—25". The lugs may be spaced so as to define slots 30 (Fig. 3) therebetween for the longitudinal insertion of the brush-strip binder 23, and in the form shown each lug 25 is formed with what I term an excess of material so that when bent straight up the slotted openings between lugs are of insufficient area to accommodate insertion of the brush-strip binders 23. This excess material may be provided at the outer limits of the slots, as at converging ear portions 26 integrally formed on opposite transverse ends of each lug 25, and the slotted openings may be effectively increased in area to an extent permitting insertion of brush-strip binders; in this connnection, a simple counterclockwise twist may be applied uniformly to some (as, for example to every other one) of the lugs 25, but in the form shown, a twist applied to all the lugs 25 may effectively increase the area of the slotted openings to permit free longitudinal insertion of the brush strips. For appearance's sake, the outer lug 27—27'—27" for each of the rows of lugs 25—25'—25", respectively, need only be formed with one such ear projection 26, as will be understood.

Figure 2:
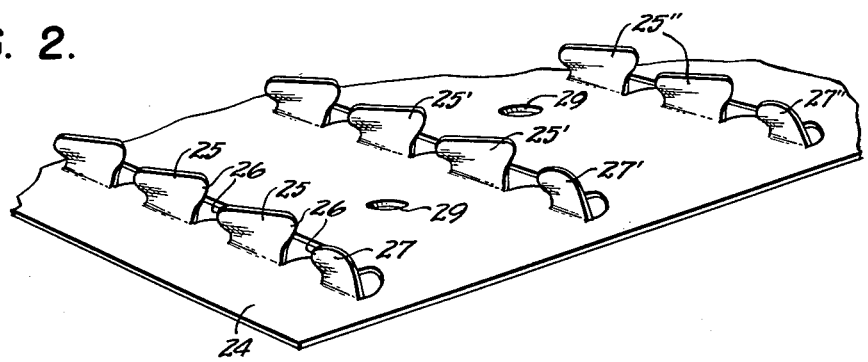
Fig. 2 is a view of the brush-supporting means of Fig. 1 prior to assembly of the brush strips thereon.
Figure 3:
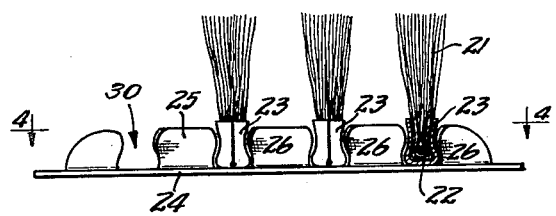
Fig. 3 is an end view of the brush-supporting means of Fig. 2, with brush strips inserted therein and prior to a clamping operation.
Figure 4:
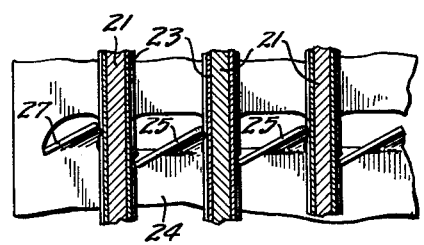
Fig. 4 is a fragmentary sectional view taken generally in the plane 4—4 of Fig. 3.
Figure 5:
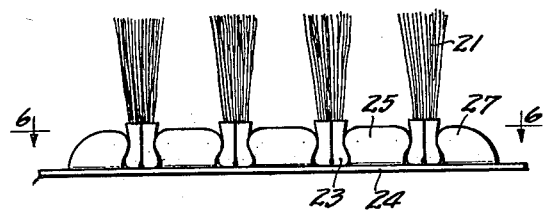
Fig. 5 is a view similar to Fig. 3, but with the parts shown after a clamping operation.
Figure 6:
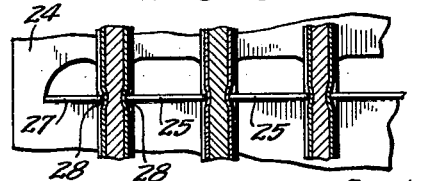
Fig. 6 is a fragmentary sectional view taken generally in the plane 6—6 of Fig. 5.

In assembling the described construction, the brush-supporting member or plate 24 will initially be formed with some or all of the lugs 25—27 twisted (as shown in Figs. 2, 3, and 4) so that a plurality of longitudinally aligned slots 30 may be presented for the free longitudinally slidable insertion of each brush-strip binder 23. Once inserted, clamping may be effected by twisting some or all of the lugs 25—27 back into generally transversely aligned relation, as shown in Figs. 1, 5 and 6. It will be appreciated that, since the slots between adjacent lugs 25—27 were of lesser cross-sectional area than the cross-sectional area of the brush-strip binders accommodated therein, the final twisting operation will be accompanied by a clamping or crimping indentation of the brush-strip binders, as at 28 (Fig. 6).

The clamping action will be understood to hold the brush strips longitudinally, and the transversely aligned relation of the clamped lugs 25—27 will be understood to promote a mutual bracing of the binders in the transverse direction. The assembly may thus be extremely rigid and secure regardless of slight variations in slot size or in the degree of final lug twisting. If desired, as in the case of a large-area plate 24, securing or mounting apertures 29 may be formed therein and preferably well distributed over the area of the plate 24, so that a flat anchorage may be assured on any desired final mounting means.

Figure 7:
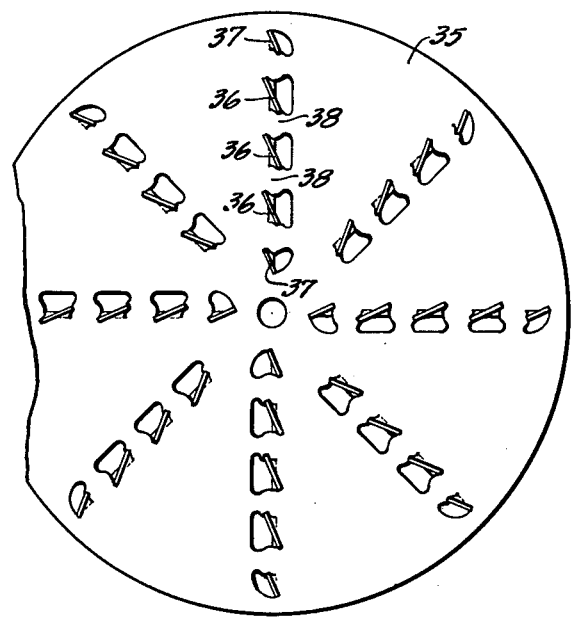
Fig. 7 is a plan view of another brush-supporting means incorporating features of the invention.
Figure 8:
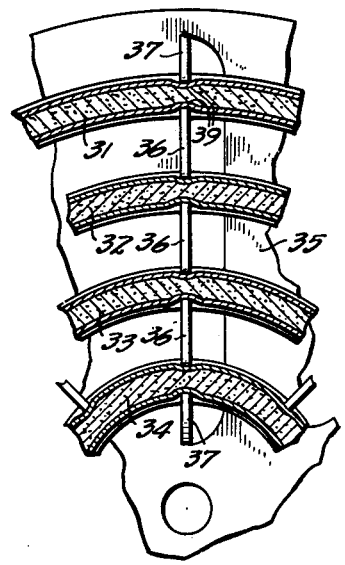
Fig. 8 is an enlarged fragmentary view of a brush-supporting means such as shown in Fig. 7 and with brush strips anchored thereon, the brush strips being shown in section in a plane taken through the areas of clamping action.

In Figs. 7 and 8, I show a modification of the general construction which has been described for Figs. 1 through 6. In Figs. 7 and 8, brush-supporting means are shown for a circular or disc brush configuration wherein the brush strip means may comprise a single helical progression of several turns or a plurality of concentric circular brush strips 31—32—33—34, as shown. The brush-supporting means may again comprise a plate 35 of sheet material, and in view of the desired configuration the plate 35 is circular. To support the brush strips, lugs may again be struck out of the body of the plate, and in the form shown I have provided such lugs in a plurality of generally radially aligned relationships, as in the case of one radial set of lugs 36. The lugs 36 may be preformed before assembly with an excess of material and twisted as shown in Fig. 7; end lugs 37 may be similarly twisted. When thus twisted, the slotted openings 38 between adjacent lugs 36—37 are preferably large enough to accommodate insertion of the brush strips 31—32—33—34, and, after such insertion, securing may be achieved by twisting the lugs 36—37 back into generally aligned relation, as shown in Fig. 8. It will be appreciated that, when thus twisted in the clamping operation, there may be local indentation, as at 39, of the various brush strips and that there may be achieved as secure an assembly as that described in the case of Fig. 1.

Figure 9:
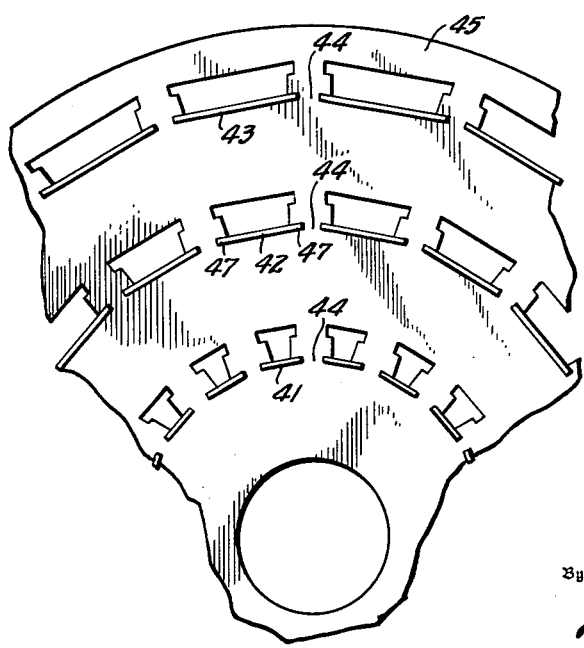
Fig. 9 is a fragmentary plan view of another brush-supporting means according to the invention.
Figure 10:
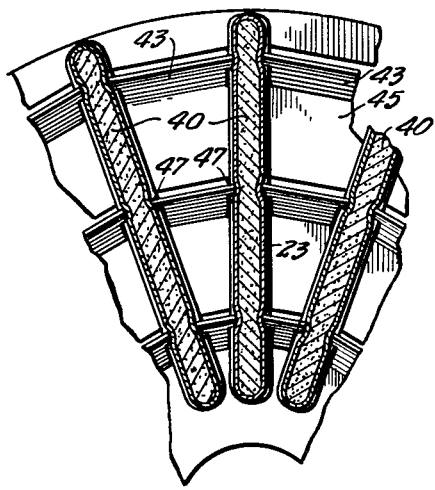
Fig. 10 is a fragmentary view of the supporting means of Fig. 9 with brush strips anchored thereon, the brush strips being shown in section in a plane through the areas of clamping action.

In Figs. 9 and 10, I show another brush-supporting means suitable for use in a circular brush configuration but wherein the brush strips 40 are to be secured in radially disposed relation. In the arrangements of Figs. 9 and 10, I have provided a plurality of generally concentric sets of lugs 41—42—43 angularly spaced from each other to define slotted openings, as at 44, of the same size and in generally radial alignment. The lugs 41—42—43 are preferably initially bent straight up from the body of the base plate 45 from which they are formed, and each lug 42 may include transverse projections, as at ears 47, so that the open mouths of the slots 44 may converge to embrace the inserted brush strips. Adjacent projections 47 are preferably spaced less than the maximum width of the brush-strip binder, and when lugs 41—42—43 are bent straight up from the base plate 45, these projections 47 will be understood to allow free insertion of the brush strips.

Securing may be achieved by bending generally back toward the plane of the base plate 45 all the various lugs 41—42—43, and as will be seen from Fig. 10 I prefer that such bending be directed generally radially outwardly. It will be appreciated that, upon bending the lugs in a securing operation, projections 47 may locally crimp the brush-strip binders 23 to provide an initial hold against radial or other dislodgment of the brush strip, and that, because the lugs are bent generally radially outwardly, the action of centrifugal force upon the brush strips, as during high-speed rotation of the assembly, may serve to enhance the degree of clamping action.

In Fig. 11, I show a modified supporting means wherein no actual deformation of parts is needed in order to effect final clamping of the brush strips. In the arrangement of Fig. 11, a plurality of brush strips 50 is supported in parallel and transversely spaced relation in a flat assembly, and each brush binder 51 is tightly clamped by a plurality of longitudinally spaced supporting members 52—52'—52". The members 52 are so formed as to require no deformation in order to clamp and hold the brush-strip binders 51, and yet to permit ready slidable insertion of the same upon initial assembly.

In Fig. 12, I show one of these supporting means as including a generally flat base with a plurality of lugs 54 bent from one edge thereof so as to define (between lugs 54) a plurality of insertion slots 55 to receive the brush-strip binders. As in other described forms, the lugs 54 may be formed with ears 56 on both transverse sides thereof, and the outer lugs 57 may, for appearance's sake, include but a single such projecting ear 56. As an alternative construction, I show in Fig. 13 a generally similar supporting means 58 which may again comprise a base plate from which the same lugs 54—57 may be struck. In the arrangement of Fig. 13, however, the lugs 54—57 are formed in a punching operation and are bent upwardly generally from the middle of the plate 58.

In assembling a construction as shown in Fig. 11, the various brush strips 50 are slidingly inserted in the slotted openings 55 of a succession of longitudinally spaced supporting members 52—52'—52" (or 58). These openings, when viewed strictly transversely of the length of the supporting means 52 or 58, are preferably of a more restricted projected area than the cross-sectional area of the brush binders 51, and the lugs 54—57 are preferably so formed that a sufficient insertion opening for the brush strips 50 is only presented when the brush strips are inserted at an angle to the ultimate angle at which the assembly is to be secured. In Fig. 14, it will be seen that this slidable insertion angle is substantially displaced from a normal secured relation of the supporting members 52—58.

The desired effective change in cross-sectional area presented by the slotted openings may be effected by providing each of the lugs 54—57 with a pre-set twist as shown. Final securing may be achieved after all brush strips 50 have been inserted in the supporting members 58 (or 52), as by a simple frame-twisting operation (i. e. twisting the supports 52 or 58 relatively to the brush-strip binders 51), which may involve exertion of a compressional force diagonally between the left-hand corner and the right-hand corner of the assembly, as viewed in Fig. 11. Upon insertion of a sufficient diagonal force, the brush strips 50 may be moved into a perpendicular orientation with respect to the supporting members 58, as shown in Fig. 15. Since the longitudinally projected area of the slots 55 is more restricted than the cross-sectional area of the binder 51, the forced displacement into the relationship of Fig. 15 will necessarily result in a crimping action between the lugs 54—57 and the brush binders 51. This crimping action may produce local indentations, as at 59, in the brush binders 51, and as long as the diagonal force can be maintained it will be understood that the brushes 50 will be held securely.

In the arrangement of Fig. 11, I maintain the diagonal holding force by means of a flat framework which may include a base plate 60 having substantially the area and shape of the completed assembly. The base plate 60 may be bent up at both longitudinally extending edges, as at 61 on one side, and at 62 on the other side, and retaining-flange means may cooperate with the flanges 61—62 to hold the supporting means 52 or 58 against outward dislodgment. In the form shown, such flange means is integrally formed at 63 with the bent-up portion 62, and along the other longitudinal edge a removable flange plate 64 may serve the same purpose. The flange plate 64 may be removably secured to the base plate 60 and in crimping relation with one transverse end of all the supporting means 52—52'—52", as by means of bolts 65. If desired, the longitudinal ends of base member 60 may also be bent up, as at 66, to form a longitudinal retaining means for the assembly.

It will be understood that, if a particular transversely extensive assembly is to be made, it may be desirable to provide further securing means to assure against central buckling of the supporting means 52 or 58. In such event, it will be seen that bolt openings, as at 67, may accommodate anchoring bolts for holding down such central parts. These bolt openings should be in general longitudinal alignment with lugs 54 so that free access may be permitted after the brush strips have been set in place.

It will be understood that the described assembly may be completed upon insertion of all remote (in the sense of Fig. 11) ends of the support means 52—52'—52" (or 58) under the integral retaining flange 63, and upon laying the other ends thereof for tentative retention (against untwisting) by the upwardly bent portion 61. A retaining plate or flange 64 may then be laid over the otherwise uncovered ends of the supporting means 52—52'—52" and all retaining bolts 65 secured.

In Fig. 16, I show a modified form of the construction which has been described in connection with Fig. 11, except that the supporting means shown therein is adaptable for use in a cylindrical brush configuration of the type generally shown in the above-identified copending patent applications; in Fig. 7, I merely show one supporting element of such a cylindrical structure. This element may be generally drum-shaped and have a cylindrical periphery 70 from which a plurality of lugs 54' may be struck in the manner shown either in Fig. 12 or Fig. 13. The drum 70 may be mounted upon a shaft by means of a collar or hub 71, and a web or flange 72 may hold and space the drum 70 from the hub 71. The slotted openings 55' between lugs 54' may have the same preferred relationship as described in connection with Figs. 12 and 13; that is, for one angle of insertion the projected area of the slots 55' may be sufficient to permit free sliding insertion of brush-strip binders 51, and in a given assembly such brush-strip binders 51 may be inserted into at least two axially spaced supporting means of the type shown in Fig. 16. Once the desired brush strips, such as 50, are thus inserted, each of the supporting means may be relatively rotated so as in effect to cause an angular shift of brush strips with respect to the slotted openings therefor. This angular shift will cause an effective reduction in the area of the slotted openings, as projected in the direction of the brush strips, and a crimping action will result. The assembly may be secured by appropriately keying or locking the various hubs 71 to a shaft, and for the form shown diametrically opposite holes 73 in the hub 71 permit insertion of a diametrically extending anchoring pin (not shown) to hold the final angularly twisted relation.

It will be appreciated that I have described relatively simple brush-supporting means for securely anchoring a plurality of brush strips. My supporting means may be fabricated at minimum expense, and rapid assembly with brush strips is possible. In all the forms described a flat or longitudinally extending area of the supporting plate or sheet from which the lug is struck is available for longitudinally extensive binding support for the brush strips, thus increasing the security of the mounting and extending the life of a given assembly.

While I have described my invention in detail for the preferred forms shown, it will be understood that modifications may be made within the scope of the invention as defined in the appended claims.

I claim:

1. In a brush holder of the character indicated for securely supporting a brush strip having a longitudinally extending binder, a member of sheet material with a plurality of generally aligned retaining lugs struck out of the body of said sheet material and bent directly out of the body of said sheet material on bend axes extending generally transversely of the longitudinal axis of a binder, said lugs defining therebetween a plurality of spaced slots opening away from the body of said sheet material, adjacent lateral edges of adjacent pairs of lugs cooperating to define outwardly directed side portions of said slots with extremities converging toward each other and partially closing the openings of said slots, the openings thereby defined at each said slot being sufficient to permit slidable insertion of a brush strip therein.

2. A brush holder according to claim 1, in which the body of said sheet material defines the bottoms of said slots, whereby there may be longitudinally extensive bottoming support for a brush strip secured in said holder.

3. A brush holder according to claim 1, in which said lugs are generally circularly aligned about an axis of rotation, whereby generally radially extending brush strips may be secured thereto.

4. In a brush holder of the character indicated for securely supporting a brush strip having a longitudinally extending binder, a member of sheet material with a plurality of retaining lugs struck directly out of the body of said sheet material and aligned generally in a plane transverse to the longitudinal axis of the binder, adjacent pairs of said lugs defining outwardly open slots therebetween, said lugs being bent out of said sheet material on bend axes extending generally transverse to the longitudinal axis of said binder and including an outer projecting part bent further and out of the plane of general alignment of said bend axes, whereby the effective openings of said slots are enlarged for the free insertion of a brush-strip binder, and further whereby, after such insertion, the brush-strip binder and the outer projecting parts of said lugs may be twisted relatively to each other in order effectively to constrict the opening in which the binder is accommodated, thereby pinching the binder between the adjacent lugs defining said opening.

5. A holder according to claim 4, in which said lugs are formed out of a single plate in longitudinally spaced generally transversely aligned rows.

6. A holder according to claim 4, in which said lugs are formed out of a single plate in generally angularly spaced rows, said rows radiating generally from the central part of said plate, whereby generally circular or helical brush-strip configurations may be secured to said plate.

7. As an article of manufacture, a clip for securely supporting a brush strip having a longitudinally extending binder, said clip being formed of sheet material and including two lugs bent directly up from a base on substantially a common axis, so as to define between said lugs a slotted opening for the accommodation of the brush-strip binder, said axis of the bends of said lugs being generally transverse to the intended orientation of the brush strip, the outer projecting end of one of said lugs being further bent out of alignment with the transverse plane including said axis, thereby defining an enlarged slotted opening, the effective projected area of said enlarged slotted opening being sufficiently large freely to accommodate brush-strip insertion.

8. In a brush holder of the character indicated for securely supporting a brush strip having a longitudinally extending binder, a member of deformable sheet material with a plurality of retaining lugs struck directly out of the body of said sheet material and aligned generally in a plane transverse to the support axis for a brush strip, said lugs being bent on axes extending generally transversely of said support axis, adjacent lugs defining therebetween a plurality of spaced slots opening away from the body of sheet material, adjacent sides of adjacent lugs cooperating to define outwardly directed side portions of said slots with extremities converging toward each other and partially closing the openings of said slots, whereby the effective cross-sectional area of said openings may be selectively modified by deformation of said extremities in order to accommodate and then secure a brush binder to said member.

9. As an article of manufacture, brush-securing means including a strip of sheet material with retaining lugs bent directly up from the body of said strip with the bends of said lugs in general alignment transversely of the support axis for an inserted brush strip, adjacent pairs of said lugs defining outwardly open slots, the walls of each of said slots being defined by said lugs and converging to partially close the slot opening near the mouth thereof.

10. An article according to claim 9, in which said lugs are formed along an edge of said strip, with the bends at said edge.

11. An article according to claim 9, in which said lugs are struck out of the body of said strip between opposite edges thereof.

12. An article according to claim 9, in which said strip is itself of rolled-up configuration to define a drum, and in which said lugs are bent to extend generally radially.

13. In combination, a plurality of longitudinally spaced brush-supporting clips, each clip being of sheet material and comprising a base with two adjacent generally transversely aligned lugs bent up from said base to define a slotted opening to receive a brush-strip binder therein, said slotted openings being of projected cross-sectional area freely to receive insertion of a brush-strip binder in a first relative angular relation of said clips and of the binder, said slotted openings being of a projected cross-sectional area less than the cross-sectional area of the binder in a second relative angular relationship of said clips and of the binder, and means for clamping said clips in said second angular relationship.

14. A brush holder comprising a plate of sheet material for supporting a plurality of generally radially extending brush strips for rotary movement about a mounting axis, said plate including a plurality of lugs bent up from said plate and angularly spaced about said axis, the spacings between adjacent lugs defining slots for accommodation of a brush-strip binder, said lugs being formed at the outer extremities of said slots with projections tending to close off the mouths of said slots, adjacent of said projections being spaced by an amount less than the maximum width of a brush-strip binder to be received therein but being sufficiently elevated from said plate to permit free insertion thereunder of the maximum-width portion of the binder, whereby said strip may be secured upon a bending of said lugs toward the surface of said plate.

15. A brush holder according to claim 14, in which said lugs are formed in generally concentric sets, the slotted openings between lugs of radially spaced sets being in general alignment.

16. A brush assembly including the holder of claim 15, and a plurality of brush strips supported by lugs defining said aligned slotted openings, said openings being in generally radial alignment, whereby said brush-strips are generally radially oriented, said lugs being bent toward said plate and radially outwardly, whereby the clamping action of said holder on said brush strips may improve under the influence of centrifugal force about said axis.

17. In combination, a brush strip including an elongated binder, and a brush holder of sheet material with a plurality of generally aligned retaining lugs struck out of the body of said sheet material and bent on bend axes extending generally transversely of the longitudinal axis of said binder, pairs of adjacent of said lugs defining therebetween a plurality of spaced slots opening away from the body of said sheet material, adjacent lateral edges of adjacent lugs cooperating to define outwardly directed side portions of said slots of an effective width slidingly accommodating the brush binder upon endwise insertion, said side portions including outer parts partially closing the openings of said slots and tightly engaging opposite sides of said binder.

18. In combination, a brush strip including an elongated binder, and a brush holder of sheet material with a plurality of generally aligned retaining lugs stuck out of the body of said sheet material and bent on bend axes extending generally transversely of the longitudinal axis of said binder, the width of said lugs at the bend thereof being substantially in excess of the thickness of the material of said lugs at such bend, pairs of adjacent of said lugs defining therebetween a plurality of spaced slots opening away from the body of said sheet material, adjacent lateral edges of adjacent lugs cooperating to define outwardly directed side portions of said slots of an effective width slidingly accommodating the brush binder upon endwise insertion, said side portions including outer parts partially closing the openings of said slots and tightly engaging opposite sides of said binder.

References Cited in the file of this patent

UNITED STATES PATENTS

| 628,668 | Knecht | July 11, 1899 |
| 711,544 | Tesch | Oct. 21, 1902 |
| 893,198 | Schachner | July 14, 1908 |
| 991,876 | Murray | May 9, 1911 |
| 1,011,831 | Murray | Dec. 12, 1911 |
| 2,271,835 | Cave | Feb. 3, 1942 |

FOREIGN PATENTS

| 655,046 | Germany | Jan. 7, 1938 |